US009008045B2

(12) United States Patent  
Srivastava et al.

(10) Patent No.: US 9,008,045 B2  
(45) Date of Patent: Apr. 14, 2015

(54) HANDOFFS BETWEEN ACCESS POINTS IN A WI-FI ENVIRONMENT

(75) Inventors: Praveen Srivastava, Ashburn, VA (US); Arun Manroa, Herndon, VA (US); Ahmed Bencheikh, Fairfax Station, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 277 days.

(21) Appl. No.: 13/445,500

(22) Filed: Apr. 12, 2012

(65) Prior Publication Data

US 2013/0272269 A1    Oct. 17, 2013

(51) Int. Cl.
- *H04W 4/00* (2009.01)
- *H04W 36/30* (2009.01)
- *H04W 36/08* (2009.01)
- *H04W 84/12* (2009.01)

(52) U.S. Cl.  
CPC .............. *H04W 36/30* (2013.01); *H04W 36/08* (2013.01); *H04W 84/12* (2013.01)

(58) Field of Classification Search  
CPC ...... H04W 36/08; H04W 60/04; H04W 60/06  
USPC ........................................................ 370/332  
See application file for complete search history.

(56) References Cited

U.S. PATENT DOCUMENTS

| 7,203,183 B2 | 4/2007 | Cromer et al. | |
| 2004/0047323 A1* | 3/2004 | Park et al. | 370/338 |
| 2005/0025103 A1* | 2/2005 | Ko et al. | 370/338 |
| 2005/0122919 A1* | 6/2005 | Touag | 370/310 |
| 2005/0208938 A1* | 9/2005 | Pecen et al. | 455/428 |
| 2006/0002350 A1* | 1/2006 | Behroozi | 370/338 |
| 2006/0187885 A1* | 8/2006 | Roy et al. | 370/332 |
| 2006/0205407 A1* | 9/2006 | Jagadeesan et al. | 455/436 |
| 2008/0031185 A1* | 2/2008 | Bims | 370/328 |
| 2008/0198811 A1* | 8/2008 | Deshpande et al. | 370/332 |
| 2008/0316982 A1* | 12/2008 | Murty et al. | 370/338 |
| 2008/0320108 A1* | 12/2008 | Murty et al. | 709/220 |
| 2009/0010190 A1* | 1/2009 | Gong | 370/311 |
| 2009/0296672 A1* | 12/2009 | Beach | 370/338 |
| 2009/0319824 A1* | 12/2009 | Liu et al. | 714/4 |

(Continued)

FOREIGN PATENT DOCUMENTS

WO    WO 2005/057881 A1    6/2005

OTHER PUBLICATIONS

International Search Report from corresponding International Application No. PCT/US2013/035085 mailed Jul. 1, 2013 pp. 9.

*Primary Examiner* — Shripal Khajuria  
*Assistant Examiner* — Joe Combs  
(74) *Attorney, Agent, or Firm* — Chapin IP Law, LLC

(57) ABSTRACT

Techniques disclosed herein include systems and methods for providing active mobility of Wi-Fi enabled devices within a given wireless local area network (WLAN). In general, techniques include dynamically commanding Wi-Fi enabled devices to disconnect from a corresponding access point in response to meeting predetermined conditions. A forced disconnect can be based on various criteria such as low-power or lost packet thresholds triggering the forced disconnect. Such techniques cause a Wi-Fi enabled device to disconnect from one access point and connect to another access point before a connection quality deteriorates to a point that causes noticeable interruptions in connectivity or a generally poor experience, thereby enabling a smooth transition among access points.

9 Claims, 6 Drawing Sheets

(56) References Cited

U.S. PATENT DOCUMENTS

| | | | |
|---|---|---|---|
| 2010/0040016 A1* | 2/2010 | Lor et al. | 370/331 |
| 2010/0128655 A1* | 5/2010 | Bims | 370/315 |
| 2010/0135256 A1* | 6/2010 | Lee et al. | 370/336 |
| 2010/0165846 A1* | 7/2010 | Yamaguchi et al. | 370/236 |
| 2012/0020319 A1* | 1/2012 | Song et al. | 370/330 |
| 2012/0099572 A1* | 4/2012 | Kato et al. | 370/338 |
| 2012/0230305 A1* | 9/2012 | Barbu et al. | 370/338 |
| 2012/0246294 A1* | 9/2012 | Eaton et al. | 709/224 |
| 2013/0077505 A1* | 3/2013 | Choudhary et al. | 370/252 |
| 2013/0103807 A1* | 4/2013 | Couto et al. | 709/220 |
| 2013/0210415 A1* | 8/2013 | Mathias et al. | 455/418 |
| 2013/0322400 A1* | 12/2013 | Visuri et al. | 370/331 |
| 2014/0043979 A1* | 2/2014 | Etemad et al. | 370/237 |

* cited by examiner

HANDOFFS BETWEEN ACCESS POINTS IN A WI-FI ENVIRONMENT

BACKGROUND

The present disclosure relates to wireless connectivity of electronic devices, and relates particularly to exchanging data wirelessly over a computer network using Wi-Fi technology.

Wi-Fi is a technology that enables computerized devices to wirelessly transmit data and connect to a computer network. Wi-Fi technology is defined by specifications from the Institute of Electrical and Electronics Engineers' (IEEE) 802.11 standards. Computerized devices such as laptop computers, mobile phones, tablet computers, etc., can connect to a computer network using a Wi-Fi access point. An access point is a device that sends and receives radio signals to enable computerized devices to connect to a wired network, such as a Local Area Network or the Internet. Access points typically have a wireless connectivity range of approximately 100 feet.

Wi-Fi technology has evolved to a hotspot model, that is, network connectivity exits within relative distinct, isolated, or segmented locations. For example, Wi-Fi connection areas are commonly found within homes of consumers, cafes, businesses, schools, etc. Users operating a laptop, cell phone, or other electronic device that connects to a wireless router or WLAN access point for wireless connectivity. Once connected, devices can be moved around within range of that given WLAN. Unlike cellular telecommunication technologies however, Wi-Fi does not have any specified handoff intelligence or protocols. This is because Wi-Fi was not designed to be or meant to be a mobility technology.

SUMMARY

Internet service providers, including cable and DSL providers, have begun to provide relatively large Wi-Fi networks across various locations. For example, in some installations, thousands of access points are deployed on or along cable strands and roads carrying communication lines. Other installations provide many access points within a particular location, such as within a shopping center, commercial buildings, public transportation systems, and so forth. Such larger Wi-Fi networks are a result of the growing demand for Wi-Fi connectivity.

Though Wi-Fi networks are enormously popular, they have some challenges. One challenge with Wi-Fi technology is that there is no handoff mechanism like those that exist with cellular telecommunications systems. Cellular telecommunication systems specify, for example, when a given electronic device should detach from one cell tower and connect with another cell tower. In contrast, with a Wi-Fi network, a given access point will maintain a connection with a given Wi-Fi enabled device, even though the given Wi-Fi enabled device is closer to another access point, is receiving a substantially stronger signal from another access point, or is losing many transmitted packets. Thus, a computerized device with a connection to a first access point and wherein this device is moving away from the first access point, will remained connected to this first access point until corresponding radio signals are no longer detectable.

Techniques disclosed herein include systems and methods for providing handoffs of Wi-Fi enabled devices within a given wireless local area network (WLAN). Techniques include forcing the Wi-Fi network to disconnect the Wi-Fi enabled device. A forced disconnect can be based on various criteria including low-power or lost packet thresholds triggering the forced disconnect. For example, when a measured power level drops below a power threshold, or when a number or rate of packets being dropped exceeds a loss threshold, logic within the Wi-Fi network or access point device can force a disconnection between the Wi-Fi enabled device and a corresponding access point. The Wi-Fi network can identify a location of other access points to facilitate a smooth transition and know when forced disconnection would be beneficial, such as within a geographic area having multiple potential access points.

One embodiment includes a wireless connectivity manager that executes a wireless connectivity process or system. The wireless connectivity manager receives a request from a client device to establish a wireless data link between the client device and a first access point device. The first access point device provides a connection to a computer network, such as the Internet. The first access point device establishes the wireless data link between the client device and the first access point device on a radio frequency communication channel. The wireless data link is used to transmit data packets between the client device and the first access point device. The system monitors at least one parameter of the wireless data link between the client device and the first access point device, such as radio signal strength. In response to determining that the at least one parameter meets a predetermined criterion, the access point device transmits a disassociate message to the client device. This disassociate message causes the client device to end the wireless data link.

Such techniques cause a Wi-Fi enabled device to disconnect from one access point and connect to another access point before a connection quality deteriorates to a point that causes noticeable interruptions in connectivity or a generally poor experience.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a request from a client device to establish a wireless data link between the client device and a first access point device, the first access point device providing a connection to a computer network; establishing the wireless data link between the client device and the first access point device on a radio frequency communication channel, the wireless data link used to transmit data packets between the client device and the first access point device; monitoring at least one parameter of the wireless data link between the client device and the first access point device; and in response to determining that the at least one parameter meets a predetermined criterion, transmitting a disassociate message to the client device, the disassociate message causing the client device to end the wireless data link. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Time Warner Cable, New York City, N.Y.

As discussed above, techniques herein are well suited for use in software applications supporting Wi-Fi connectivity. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
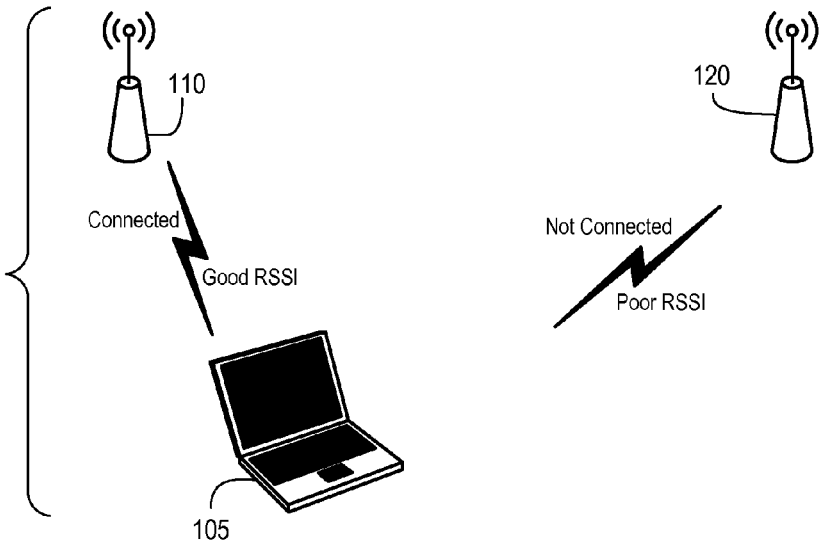
FIG. 1 is a block diagram of a computerized device with wireless connectivity in a Wi-Fi environment according to embodiments herein.

Techniques disclosed herein include systems and methods for providing active mobility of Wi-Fi enabled devices within a given wireless local area network (WLAN). In general, techniques include dynamically commanding or messaging Wi-Fi enabled devices to disconnect from a corresponding access point in response to meeting predetermined conditions. A forced disconnect can be based on various criteria, such as low-power or lost packet thresholds triggering the forced disconnect. For example, when a measured power level or radio signal strength drops below a specific threshold, or when a number or rate of packets being dropped exceeds a loss threshold, then logic within the Wi-Fi network or access point device can transmit a disconnect command or message to the Wi-Fi enabled device and a corresponding access point.

One challenge in providing Wi-Fi mobility is that from the perspective of device chipsets and the Wi-Fi specification itself (802.11), once a Wi-Fi device attaches to an access point or wireless router, there is no standard built into the Wi-Fi specification that causes devices to continue to scan for access points or scan for a better signal after a Wi-Fi enabled device attaches to a given access point, and also to initiate transfer to a particular access point having a better signal. Conventionally, once a Wi-Fi enabled device attaches to (establishes a communication link with) a Wi-Fi access point, the Wi-Fi enabled device remains attached to the given access point—even if the Wi-Fi enabled device passes other closer access points. For example, a user may be traveling along a road that has access points spaced at intervals along the road. A user's Wi-Fi enabled device then attaches to a first access point. In this example, as the user travels along the road, the user may pass a second or third access point, but the Wi-Fi enabled device would keep its connection to the first access point until it can no longer support any radio communications with the first access point. Thus, even though signal strength from the first access point decreases while signal strength from the second or third access point increases, the Wi-Fi enabled device with remain connected to (stick with) the first access point as long as possible. That is, there is no active mechanism in Wi-Fi for handoffs to thereby provide mobility in a Wi-Fi environment. Because of this "stickiness" of Wi-Fi devices, there is no handover among access points. This stickiness, in mobile scenarios, causes loss of packets, delay, and a generally poor connectivity experience.

It is essentially impractical to modify or create a new Wi-Fi standard that specifies how wireless devices provide mobility (active mobility) across access points. This impracticality is in part due to the existence of millions and millions of Wi-Fi enabled devices that are currently in use. Changing the logic and chipsets in all of these devices would be impractical and cost prohibitive. Techniques disclose herein, however, provide mobility across access points via a network-based approach. According to such techniques, access points and other network devices are modified to look for and move wireless devices to new or different access points to improve mobility.

Figure 2:
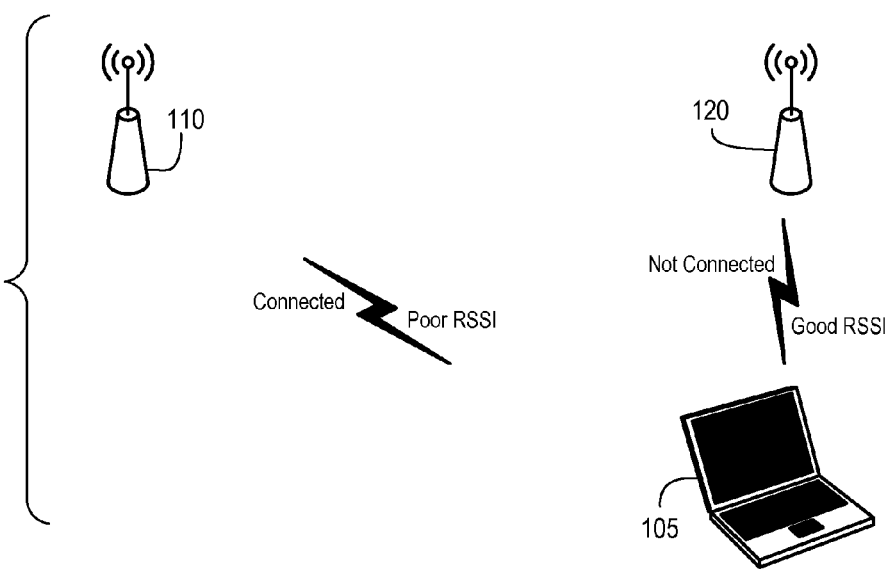
FIG. 2 is a block diagram of a computerized device with wireless connectivity in a Wi-Fi environment supporting mobility according to embodiments herein.

FIGS. 1 and 2 show a simplified Wi-Fi environment that includes Wi-Fi enabled device 105, first access point device 110 and second access point device 120. Each access point provides wireless connectivity to a wired network via Wi-Fi technology. Access point devices, also known as wireless access points (WAP), can relay data between wireless devices and a router. Some access point devices can also include routing functionality. Wi-Fi enabled device 105 is connected to access point 110 in both FIG. 1 and FIG. 2, in that Wi-Fi enabled device 105 and access point 110 have established a communication channel with each other for sending and receiving data and accessing remote network resources through a wired network. Wi-Fi enabled device 105 can also be identified as a wireless device or client device (with wireless functionality). Note that wireless devices, as used herein, refer to any devices that include functionality to transmit data and signals wirelessly, even though they may also include an interface for wired connectivity.

In FIG. 1, device 105 and access point 110 have good radio signal strength, while radio signal strength between device 105 and access point 120 is poor. FIG. 2 shows that device 105 has moved physically closer to access point 120. As a result of this move, there is now good radio signal strength between access point 120 and device 105, while radio signal strength between access point 110 and device 105 has become poor. Note that despite having poor radio signal strength between access point 110 and device 105, wireless device 105 is still connected to access point 110.

Conventionally, client devices that are connected to a particular access point will remain connected to that access point, irrespective of the status in an uplink transmission (signal sent by the client device to access point), and can remain connected even until the client device looses a downlink connection (signal sent by access point to client device). Once a client device looses the connection in the downlink, the client device will begin rescanning for available access points and will request a connection to a best available access point based on priority, best downlink signal, and/or other related factors.

Techniques disclosed herein provide a handover process that primarily executes on the network side, that is, functionality that is executed by the access point devices and/or corresponding network controllers. The handover process can be triggered by sending a disconnect message to the client device under certain received signal strength indicator (RSSI) conditions, under certain uplink error rate conditions, or under other factors related to quality of a specific wireless connection.

In one embodiment, access point (AP) 110 is measuring a radio receive level from the Wi-Fi enabled device 105. Likewise, access point 120 is also measuring a radio receive level from device 105, even though device 105 is not currently connected to access point 120. Optionally, the two access points can use a common location where this radio information can be shared across the access points. Such sharing can be via a centralized Wi-Fi network, or an ad hoc network, and will be discussed more in the following figures. Regardless of whether the access points are communicating with each other (directly or indirectly), it is helpful for a given access point to know that there are other peer or neighboring access points with which the device 105 can establish a connection. With no neighboring access point devices, the device 105—after disconnecting from a given access point—will continuously try to reconnect with the given access point.

Knowing that there are other Wi-Fi connection options available in a particular area can be beneficial because Wi-Fi enabled devices do not actively or continuously scan for access points as long as the Wi-Fi enabled device is attached to one access point. Note that some Wi-Fi enabled devices can scan for other access points and record these additional access points (even when connected to a first access point), but these Wi-Fi enabled device nevertheless do not move to the other access points even when there is a stronger signal from the other access points. Also, the Wi-Fi enabled devices do not report results of their scans upstream to any central management server or controller. Connectivity is often maintained even if connectivity of the uplink signal is lost. Until a Wi-Fi enabled device is disconnected in the downlink, the device will remain connected to the current access point, even if there is a substantially stronger signal from another access point.

FIG. 2 also illustrates an example handover situation in which the access points are autonomous in that access point 110 and access point 120 may have no knowledge of each other, or are at least not sharing information. In such an embodiment, a decision to disassociate depends on an access point's own measurements and analysis. Access point 110 measures the uplink or receive signal and, upon meeting a particular threshold, the connected access point 110 will push the client device 105 out of the network or out of connectivity with the first access point. In this scenario, access point 110 can detect that the RSSI has dropped below a predetermined threshold, and in response transmits a disassociate command to the device 105. In response to receiving this command, the device 105 ends a wireless connection with access point 110. After ending the wireless connection, the device 105 begins scanning for radio signals or accesses a recent report of scanned signals from candidate access points, and then requests a connection (typically) to an access point having a best signal. In other words, the client device will try to re-associate with another access point having the best signal available, which can be based on a priority list maintained at the client. In the FIG. 2 example, with device 105 being physically closer to access point 120, device 105 will most likely detect that the radio signal strength to access point 120 is substantially stronger than a signal received from access point 110. Thus, after access point 110 transmits the disassociate command, it is expected that device 105 will subsequently establish a connection with access point 120. In the Wi-Fi interface there exists a message called "disassociate." This is a message that the network can send to a given Wi-Fi enabled device, according to the Wi-Fi specification. This message is rarely used and included as essentially an emergency resource, such as when an access point is being shut down for maintenance. By using a standards-based message, there is no need to change the millions and millions of Wi-Fi enabled devices. Thus, there is no burden of adding new protocols to existing client devices, yet mobility can be provided to mobile Wi-Fi enabled devices.

Thus, the access point or corresponding network can measure one or more radio frequency parameters or other connection parameters corresponding to a particular Wi-Fi enabled device or wireless connection to the Wi-Fi enabled device. In response to meeting (or falling below) a particular threshold of connection parameters, the access point or corresponding network controller sends explicit instructions for the Wi-Fi enabled device to disassociate with its connected access point. Such disassociation then initiates a process in the device 105 to look for another access point with which to connect. The system herein essentially spurs the device 105 to connect to a second or different access point, despite the client device lacking such mobility intelligence. To facilitate this change and ensure connection to a different access point, the disassociate message can be sent at a threshold that would not result in re-association with the first access point. For example, a first access point is receiving a radio signal from a client device at a power of −75 db, which is a relatively low power, and consider for this example that a second access point is at a power of −50 db. In this example the first access point sends a disassociate message to the client device and the client device disassociates from the first access point. At this point the client device executes a quick scan of access points and discovers that the second access point has better power and so the client device will connect to the second access point. Such disconnection and reconnection can happen sufficiently fast such that there is no noticeable interruption in calls, downloads, or other data transfers. If however, the first access point was receiving moderate signal strength from the client device, then the first access point may wait until signal strength degrades to a point where the client device would most likely find a neighboring access point having a higher signal strength. Associating with the second access point can include any expected credentialing for a given WLAN. Such a handover technique can work on a same service set identifier (SSID). Thus, instead of moving to another SSID and restarting a scan, the device 105 tries to move to another access point with the same SSID.

The access point can measure several parameters. For example, access points can measure a receive level or radio power level, a packet error rate, a packet loss rate, and so forth. For example, the system can detect that the power level is sufficient, but that there may be too much radio frequency noise such that there are packet collisions on a specific channel. In response, the access point can cause a disassociation, especially when identifying that a second access point will likely connect with the client device. If the second access point has a substantially lower power, then sending a disassociation command would accomplish little because the client device would most likely try to reconnect with the first access point. Note that with Wi-Fi technology, establishing a wireless connection is initiated by the client device instead of by the access point. A connection request can be based on the priority defined in a client list of access points, in that the client device makes a selection and initiates establishing a wireless connection.

Figure 3:
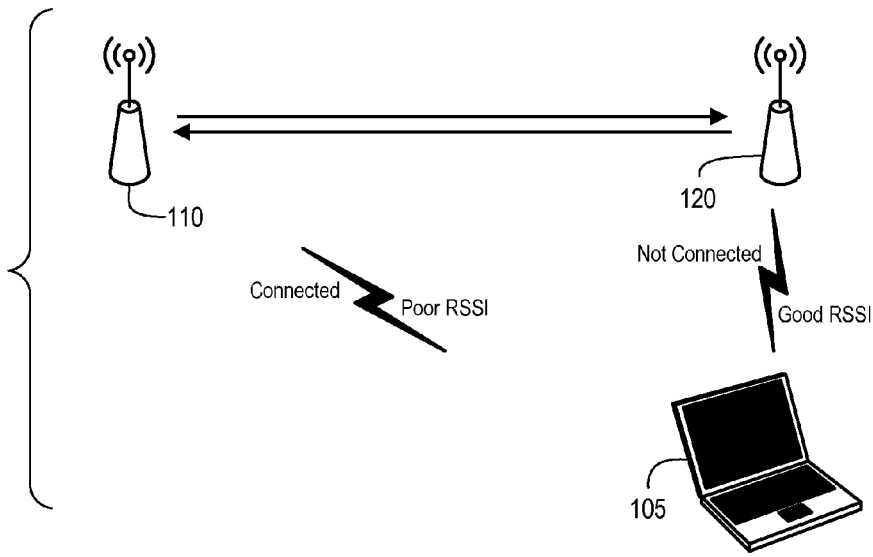
FIG. 3 is a block diagram of a computerized device with wireless connectivity in a Wi-Fi environment supporting ad hoc access point communication according to embodiments herein.

FIG. 3 illustrates an example Wi-Fi environment in which access point 110 and access point 120 use an ad hoc communication mechanism. With such direct communication, access point 110 and access point 120 can share information directly, without any central or upstream system. Access point 120 passively listens on the packets from client device 105, and shares that knowledge with access point 110 directly. Such information and corresponding measurements give enough information for access point 110 to determine when to issue the disassociate message.

Figure 4:
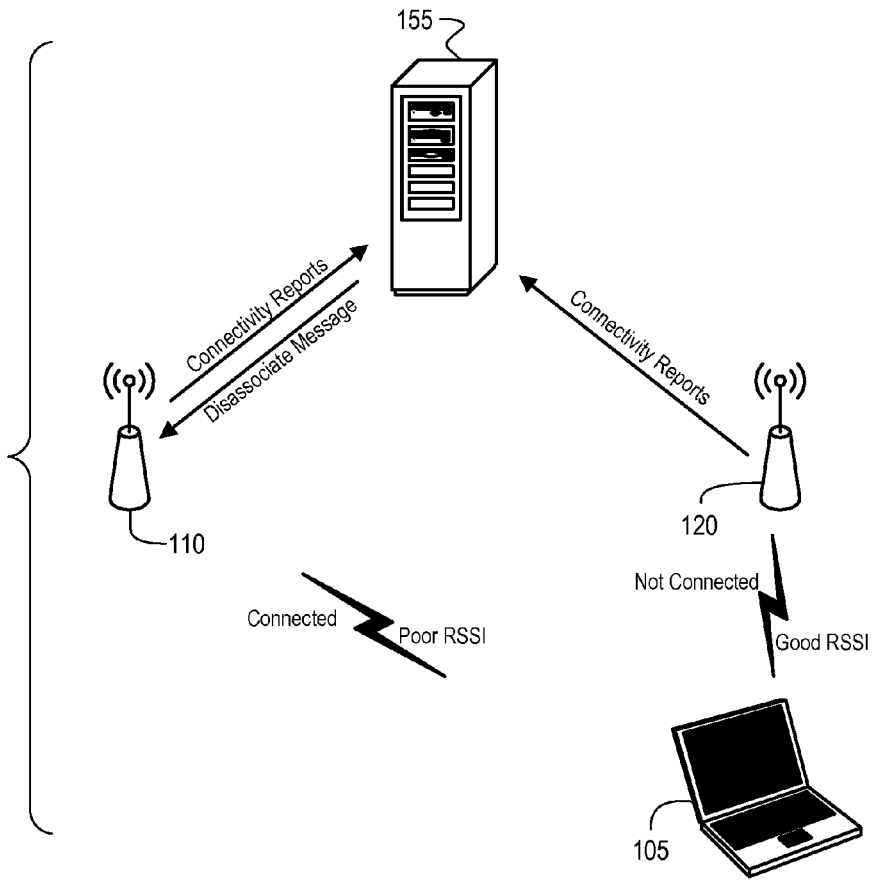
FIG. 4 is a block diagram of a computerized device with wireless connectivity in a Wi-Fi environment supporting access point communication via a central controller according to embodiments herein.

FIG. 4 illustrates an example Wi-Fi environment in which access point 110 and access point 120 use an upstream controller 155. Controller 155 can be local device, or remote server computer accessible via a wired network. With such indirect communication, access point 110 and access point 120 can share information. Access point 120 passively listens on the packets from client device 105, and shares that knowledge with controller 155. Access point 110 active listens and measures RSSI and other parameters and transmits this information to controller 155. Such information and corresponding measurements give enough information for controller 155 to determine when to issue the disassociate message.

Because client device 105 is transmitting packets to first access point 110 via radio frequency transmission, some of those packets can be received or detected at second access point 120. The access point 120 would not need to read these packets, but logic is extended such that the second access point 120 can see those packets, measure associated parameters, and send that knowledge to a central controller. Thus, the second access point 120 can passively monitor the client device 105 even though the client device is not connected to that access point. The second access point 120 can then send this information to a central server or controller 155 or designated peer device. The controller 155 can then determine that the second access point 120 is receiving a substantially stronger signal, and, in response, direct the first access point 110 to send a disassociate message to the client device 105 so that the client device is free to establish a wireless connection with the second access point.

In one embodiment, the network can share information with adjacent/neighboring access points, and then a central server/controller can contact the adjacent access points and request those adjacent access points to scan for a specific channel and MAC address corresponding to the client device 105 connected to the first access point 110. This can reduce the burden on adjacent access points so that they only listen for specific client devices that could be potential handover candidates. Otherwise, the neighboring access points could be monitoring too many devices, which could slow performance. This logic can be embedded in an access point or operate at the controller device 155.

The system can maintain the same IP address of the client device 105 to keep the handover transition between access points seamless. The higher level controller or server can then transmit packets to the second access point 120 after a transition so that the second access point immediately begins sending packets to the client device 105. A handover threshold amount can be selected such as to be sufficient that the client device 105 would not want to flip-flop between access points, such as when the client device is about halfway between the two access points. In addition, after a given access point sends a disassociate command, that access point can wait several seconds before allowing the Wi-Fi enabled device to reconnect, as a means to nudge the client device to request a connection with a different access point.

Figure 8:
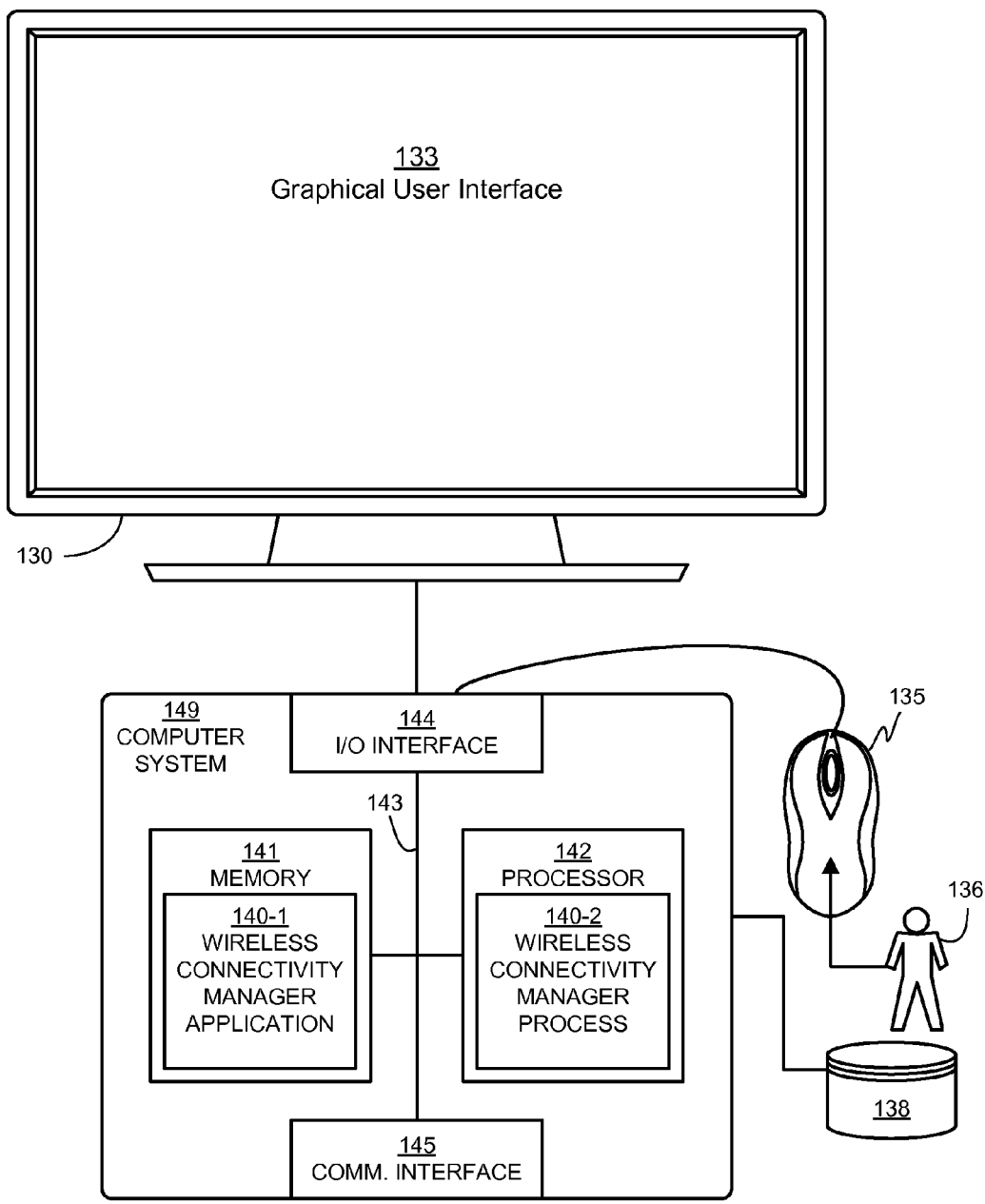
FIG. 8 is an example block diagram of a wireless connectivity manager operating in a computer/network environment according to embodiments herein.

FIG. 8 illustrates an example block diagram of a wireless connectivity manager 140 operating in a computer/network environment according to embodiments herein. Computer system hardware aspects of FIG. 8 will be described in more detail following a description of the flow charts.

Functionality associated with wireless connectivity manager 140 will now be discussed via flowcharts and diagrams in FIG. 5 through FIG. 7. For purposes of the following discussion, the wireless connectivity manager 140 or other appropriate entity performs steps in the flowcharts.

Figure 5:
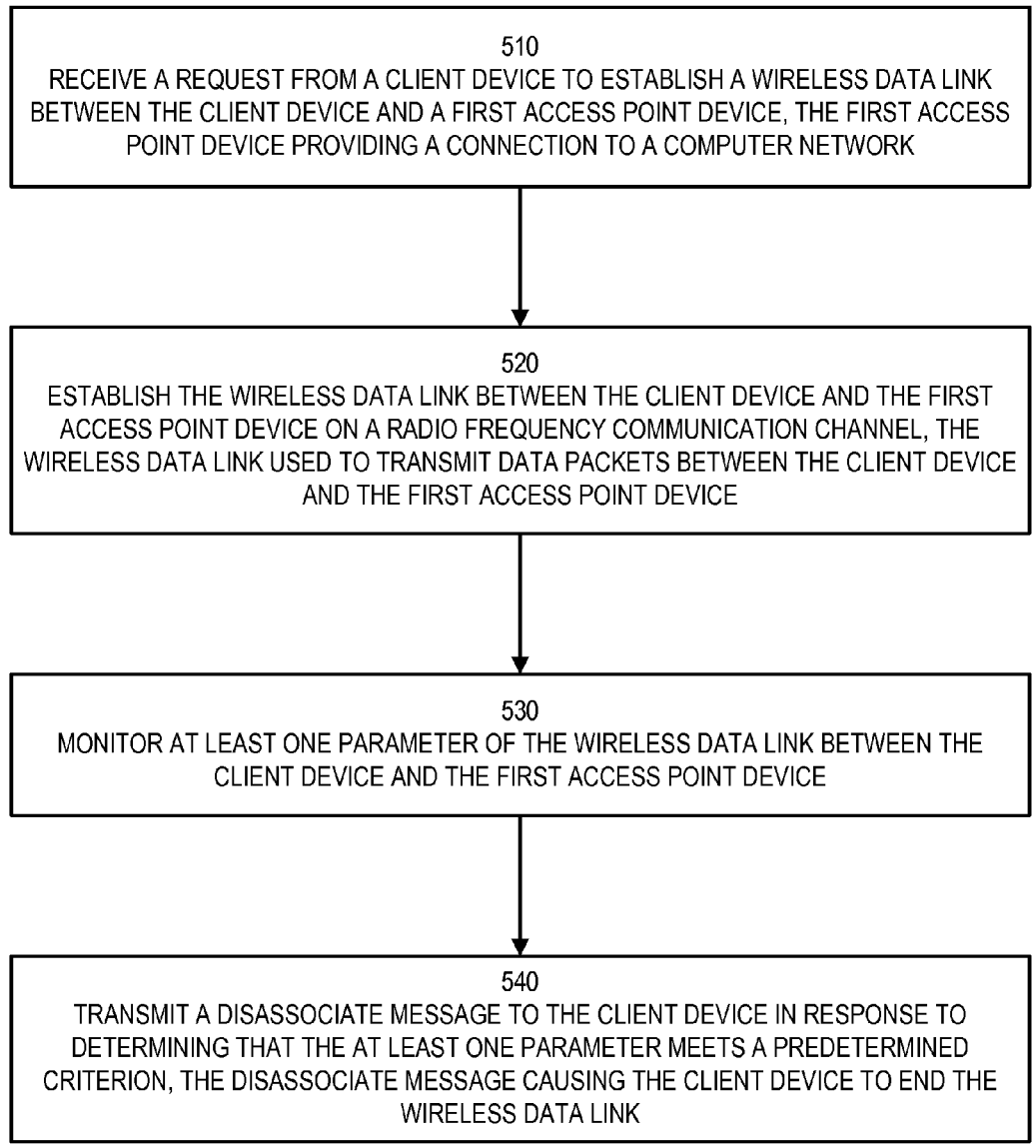
FIG. 5 is a flowchart illustrating an example of a process supporting Wi-Fi mobility according to embodiments herein.

Now describing embodiments more specifically, FIG. 5 is a flow chart illustrating embodiments disclosed herein. In step 510, the wireless connectivity manager receives a request from a client device to establish a wireless data link between the client device and a first access point device. The first access point device provides a connection to a computer network, such as the Internet or other wired network.

In step 520, the wireless connectivity manager establishes the wireless data link between the client device and the first access point device on a radio frequency communication channel. The wireless data link is used to transmit data packets between the client device and the first access point device. By way of a non-limiting example, a mobile phone or tablet computer makes a request to establish an Internet connection at a given hotspot or access point provided by an Internet Service Provider.

In step 530, the wireless connectivity manager monitors at least one parameter of the wireless data link between the client device and the first access point device. Parameters can include various connectivity statistics and metrics.

In step 540, the wireless connectivity manager (or access point device) transmits a disassociate message to the client device in response to determining that the at least one parameter meets a predetermined criterion. The disassociate message causes the client device to end the wireless data link. For example, the wireless connectivity manager determines that wireless signal strength is relatively weak.

Figure 6:
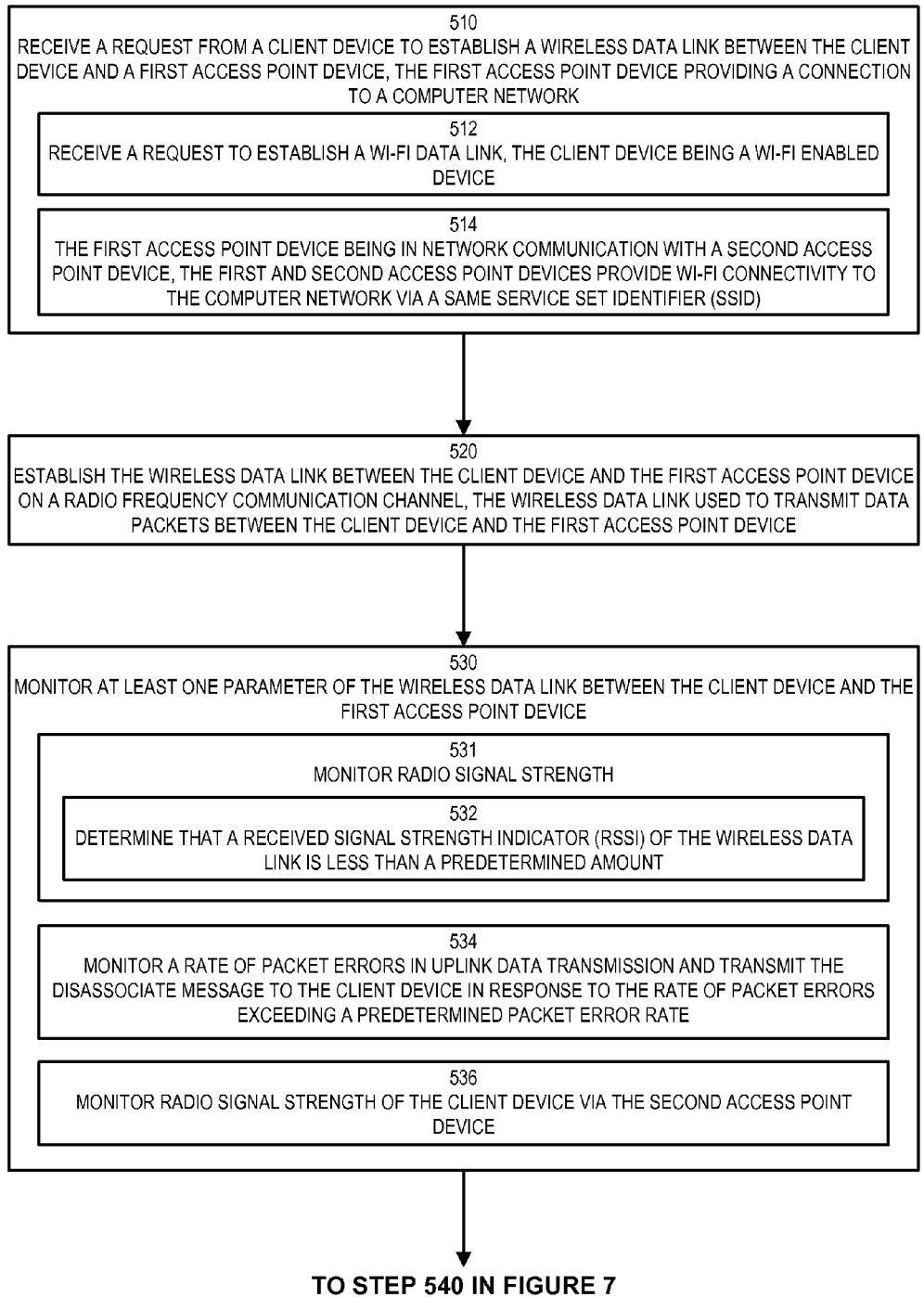
FIGS. 6-7 are a flowchart illustrating an example of a process supporting Wi-Fi mobility according to embodiments herein.
Figure 7:
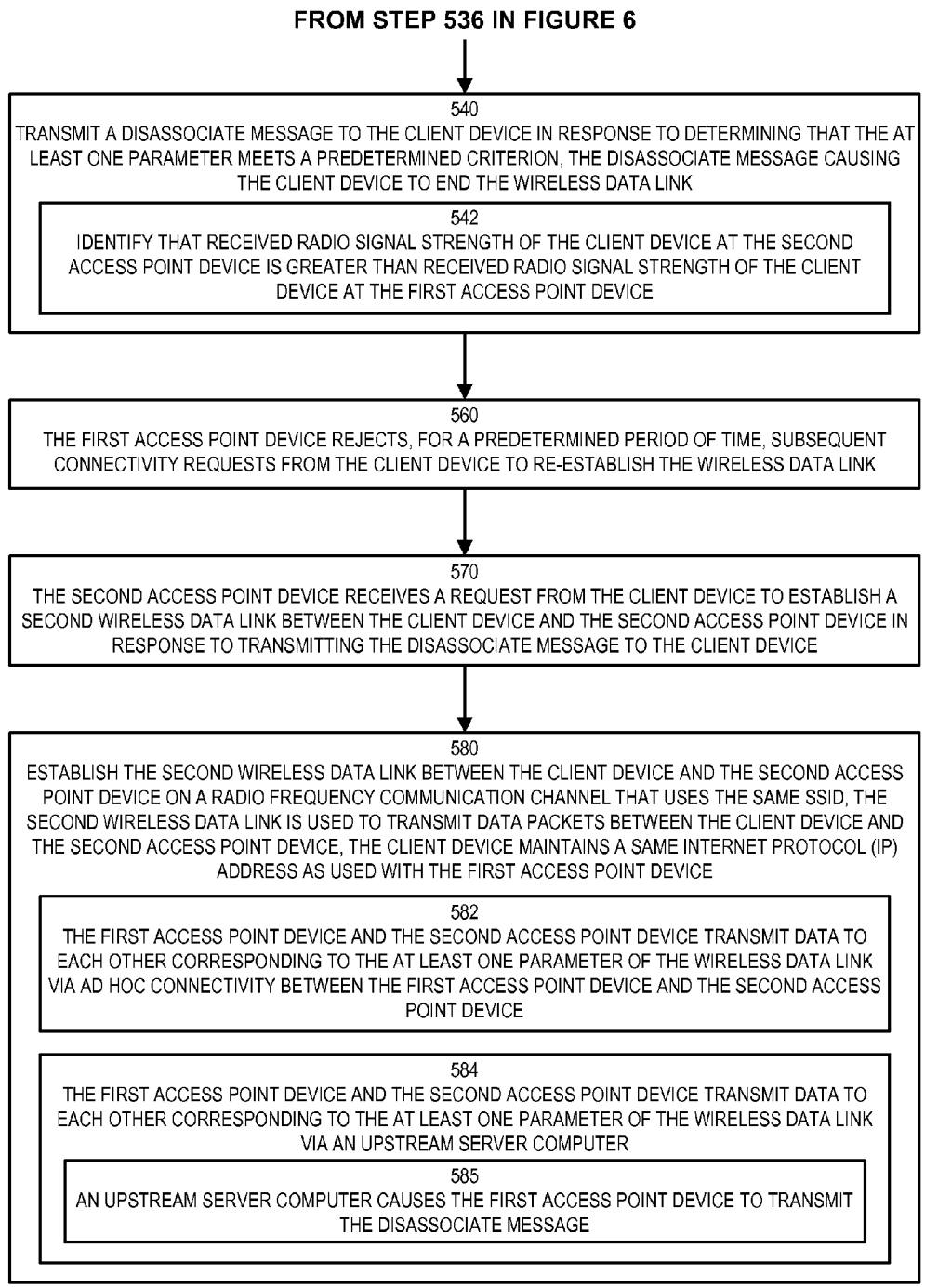

FIGS. 6-7 include a flow chart illustrating additional and/or alternative embodiments and optional functionality of the wireless connectivity manager 140 as disclosed herein.

In step 510, the wireless connectivity manager receives a request from a client device to establish a wireless data link between the client device and a first access point device. The first access point device provides a connection to a computer network.

In step 512, the access point device receives a request to establish a Wi-Fi data link, with the client device being a Wi-Fi enabled device.

In step 514, the first access point device is in network communication with a second access point device. The first and second access point devices providing Wi-Fi connectivity to the computer network via a same service set identifier (SSID). By way of a non-limiting example, the access points could be part of an array of access points provided by an ISP in a given geographical area such that client devices can be within radio communication range of two or more access points simultaneously.

In step 520, the wireless connectivity manager establishes the wireless data link between the client device and the first access point device on a radio frequency communication channel. The wireless data link is used to transmit data packets between the client device and the first access point device.

In step 530, the wireless connectivity manager monitors at least one parameter of the wireless data link between the client device and the first access point device.

In step 531, the wireless connectivity manager monitors radio signal strength. In step 532, the wireless connectivity manager determines that a received signal strength indicator (RSSI) of the wireless data link is less than a predetermined amount.

In step 534, the wireless connectivity manager monitors a rate of packet errors in uplink data transmission, and transmits the disassociate message to the client device in response to the rate of packet errors exceeding a predetermined packet error rate. For example, in some situations, the client device may have about a same signal strength of two access points, but because of packet errors or noise, the wireless connectivity manager can determine to close the connection to either have the client device reconnect with a different access point or with the same access point on a different channel.

In step 536, the wireless connectivity manager monitors radio signal strength of the client device via the second access point device. For example, the second access point can acquire a MAC address of the client device, and then passively measure signal strength.

In step 540, the wireless connectivity manager (or access point device) transmits a disassociate message to the client device in response to determining that the at least one parameter meets a predetermined criterion. The disassociate message causes the client device to end the wireless data link.

In step 542, the wireless connectivity manager identifies that received radio signal strength of the client device at the second access point device is greater than received radio signal strength of the client device at the first access point device. This knowledge can assist in a decision to send a disassociate message.

In step 560, the first access point device rejects, for a predetermined period of time, subsequent connectivity requests from the client device to re-establish the wireless data link. For example, after transmitting the disassociate message, the first access point device can refuse to credential the client device for ten seconds as a technique to nudge the client device to request a connection from another access point device.

In step 570, the second access point device receives a request from the client device to establish a second wireless data link between the client device and the second access point device in response to transmitting the disassociate message to the client device.

In step 580, the second access point device establishes the second wireless data link between the client device and the second access point device on a radio frequency communication channel. The second wireless data link uses the same SSID. The second wireless data link is used to transmit data packets between the client device and the second access point device. The client device maintains a same Internet Protocol (IP) address as used with the first access point device. Keeping a same SSID and IP address assists with a seamless transition between access points.

In step 582, the first access point device and the second access point device transmit data to each other corresponding to the at least one parameter of the wireless data link via ad hoc connectivity between the first access point device and the second access point device.

In step 584, the first access point device and the second access point device transmit data to each other corresponding to the at least one parameter of the wireless data link via an upstream server computer or controller device.

In step 585, an upstream server computer causes the first access point device to transmit the disassociate message to the client device.

In another embodiment, the system can identify a geographic location of the client device relative to the first access point device and the second access point device, such as with triangulation. In such an embodiment, transmitting the disassociate message can also be in response to the geographic location of the client device. For example, the system can detect that the client device is moving in a particular direction or towards a particular access point and can send a disassociate message at a point that will enable seamless transition between access points.

Continuing with FIG. 8, the following discussion provides a basic embodiment indicating how to carry out functionality associated with the wireless connectivity manager 140 as discussed above. It should be noted, however, that the actual configuration for carrying out the wireless connectivity manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the wireless connectivity manager 140 of computer system 149 to communicate over a network and, if necessary, retrieve any data required to create views, process content, communicate with a user, etc. according to embodiments herein.

As shown, memory system 141 is encoded with wireless connectivity manager 140-1 that supports functionality as discussed above and as discussed further below. Wireless connectivity manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the wireless connectivity manager 140-1. Execution of the wireless connectivity manager 140-1 produces processing functionality in wireless connectivity manager process 140-2. In other words, the wireless connectivity manager process 140-2 represents one or more portions of the wireless connectivity manager 140 performing within or upon the processor 142 in the computer system 149.

It should be noted that, in addition to the wireless connectivity manager process 140-2 that carries out method operations as discussed herein, other embodiments herein include the wireless connectivity manager 140-1 itself (i.e., the unexecuted or non-performing logic instructions and/or data). The wireless connectivity manager 140-1 may be stored on a non-transitory, tangible computer-readable storage medium including computer readable storage media such as floppy disk, hard disk, optical medium, etc. According to other embodiments, the wireless connectivity manager 140-1 can also be stored in a memory type system such as in firmware, read only memory (ROM), or, as in this example, as executable code within the memory system 141.

In addition to these embodiments, it should also be noted that other embodiments herein include the execution of the wireless connectivity manager 140-1 in processor 142 as the wireless connectivity manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer-implemented method for managing wireless connectivity, the computer-implemented method comprising:

in a wireless local area network (WLAN), receiving a request from a client device to establish a wireless data link between the client device and a first access point device, the first access point device providing a connection to a network of interconnected computers;

in the wireless local area network (WLAN), establishing the wireless data link between the client device and the first access point device on a radio frequency communication channel, the wireless data link used to transmit data packets between the client device and the first access point device;

in the wireless local area network (WLAN), monitoring at least one parameter indicative of the wireless data link between the client device and the first access point device, the at least one parameter selected from the group consisting of a received signal strength indicator (RSSI) of the wireless data link and a rate of packet errors in uplink data transmission on the wireless data link;

in response to determining that the at least one indicative parameter meets a predetermined criterion, transmitting a disassociate message to the client device, the disassociate message causing the client device to end the wireless data link with the first access point device in the wireless local area network (WLAN), the first access point device being in network communication with a second access point device, the first and second access point devices providing Wi-Fi connectivity to the computer network via a same service set identifier (SSID);

in response to transmitting the disassociate message to the client device, the second access point device receiving a request from the client device to establish a second wireless data link between the client device and the second access point device;

establishing the second wireless data link between the client device and the second access point device on a radio frequency communication channel using the same SSID, the second wireless data link used to transmit data packets between the client device and the second access point device, the client device maintaining a same Internet Protocol (IP) address as used with the first access point device;

monitoring radio signal strength of the client device via the second access point device; and wherein determining that the at least one parameter meets a predetermined criterion includes identifying that received radio signal strength of the client device at the second access point device is greater than received radio signal strength of the client device at the first access point device.

2. The computer-implemented method of claim 1, wherein receiving the request from the client device to establish the wireless data link comprising receiving a request to establish a Wi-Fi data link, the client device being a Wi-Fi enabled device.

3. The computer-implemented method of claim 1, further comprising:

in response to transmitting the disassociate message to the client, the first access point device rejecting, for a predetermined period of time, subsequent connectivity requests from the client device to re-establish the wireless data link.

4. The computer-implemented method of claim 1, wherein the first access point device and the second access point device transmit data to each other corresponding to the at least one parameter of the wireless data link via ad hoc connectivity between the first access point device and the second access point device.

5. The computer-implemented method of claim 1, wherein the first access point device and the second access point device transmit data to each other corresponding to the at least one parameter of the wireless data link via an upstream server computer.

6. The computer-implemented method of claim 1, wherein transmitting the disassociate message to the client device includes an upstream server computer causing the first access point device to transmit the disassociate message.

7. The computer-implemented method of claim 1, further comprising:
identifying a geographic location of the client device relative to the first access point device and the second access point device;
wherein transmitting the disassociate message is also in response to the geographic location of the client device.

8. A system for managing wireless connectivity in a wireless local area network (WLAN), the system comprising:
a processor; and
a memory coupled to the processor, the memory storing instructions that, when executed by the processor, cause the system to perform the operations of:
receiving a request from a client device to establish a wireless data link between the client device and a first access point device, the first access point device providing a connection to a computer network;
establishing the wireless data link between the client device and the first access point device on a radio frequency communication channel, the wireless data link used to transmit data packets between the client device and the first access point device;
monitoring at least one parameter of the wireless data link between the client device and the first access point device, the at least one parameter selected from the group consisting of a received signal strength indicator (RSSI) of the wireless data link and a rate of packet errors in uplink data transmission on the wireless data link; and in response to determining that the at least one parameter meets a predetermined criterion, transmitting a disassociate message to the client device, the disassociate message causing the client device to end the wireless data link, the first access point device being in network communication with a second access point device, the first and second access point devices providing Wi-Fi connectivity to the computer network via a same service set identifier (SSID);
in response to transmitting the disassociate message to the client device, the second access point device receiving a request from the client device to establish a second wireless data link between the client device and the second access point device;
establishing the second wireless data link between the client device and the second access point device on a radio frequency communication channel and using the same SSID, the second wireless data link used to transmit data packets between the client device and the second access point device, the client device maintaining a same Internet Protocol (IP) address as used with the first access point device;
monitoring radio signal strength of the client device via the second access point device; and
wherein determining that the at least one parameter meets a predetermined criterion includes identifying that received radio signal strength of the client device at the second access point device is greater than received radio signal strength of the client device at the first access point device.

9. The computer system claim 8, wherein receiving the request from the client device to establish the wireless data link comprising receiving a request to establish a Wi-Fi data link, the client device being a Wi-Fi enabled device.

* * * * *